Figure 1:
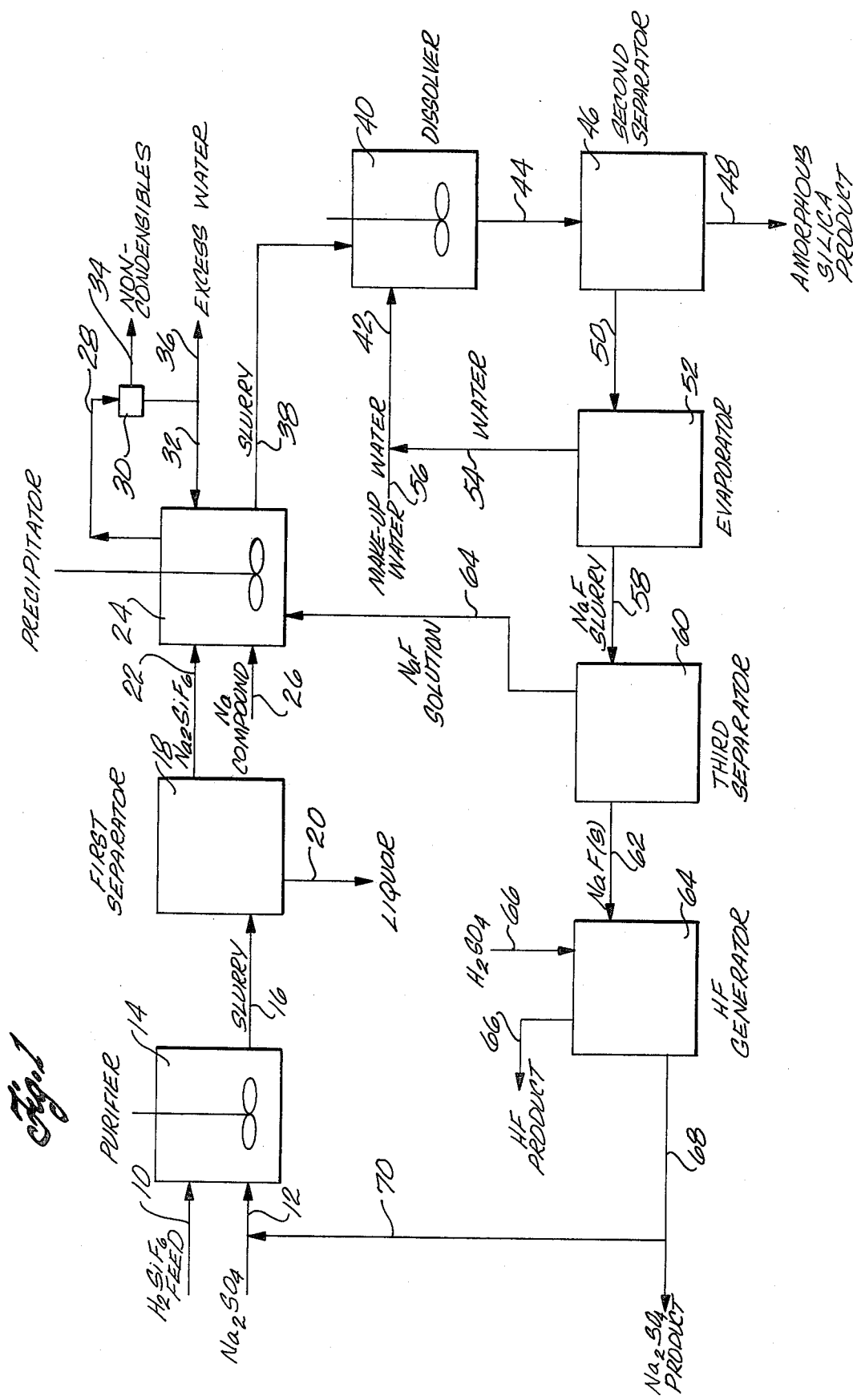

United States Patent [19]

Sikdar

[11] 4,298,586

[45] Nov. 3, 1981

[54] RECOVERY OF HYDROFLUORIC ACID FROM FLUOSILICIC ACID

[75] Inventor: Subhas K. Sikdar, San Juan Capistrano, Calif.

[73] Assignee: Occidental Research Corp., Irvine, Calif.

[21] Appl. No.: 177,558

[22] Filed: Aug. 23, 1980

Related U.S. Application Data

[63] Continuation of Ser. No. 953,803, Oct. 23, 1978, abandoned.

[51] Int. Cl.$^3$ .................... C01B 33/12; C01B 7/22; C01D 3/02
[52] U.S. Cl. ................................ 423/339; 423/341; 423/483; 423/484; 423/490; 423/551
[58] Field of Search .............. 423/332, 339, 341, 483, 423/484, 490, 551

[56] References Cited

U.S. PATENT DOCUMENTS

| | | | |
|---|---|---|---|
| 1,324,030 | 12/1919 | Bowman | 423/490 |
| 3,061,541 | 10/1962 | Henry. | |
| 3,278,265 | 10/1966 | Quarles. | |
| 3,506,394 | 4/1970 | Okamura et al. | 423/490 X |
| 3,537,817 | 11/1970 | Bachelard. | |
| 3,549,317 | 12/1970 | Dorn et al. | 423/339 |
| 3,563,699 | 2/1971 | Cuneo et al. | 423/339 X |
| 3,689,216 | 9/1972 | Brown. | |
| 3,755,532 | 8/1973 | Harrison et al. | 423/290 X |
| 3,878,294 | 4/1975 | Schabacher et al. | |
| 3,914,398 | 10/1975 | Faust. | |

FOREIGN PATENT DOCUMENTS

| 2257948 | 6/1973 | Fed. Rep. of Germany | 423/490 |
|---|---|---|---|
| 46-20134 | 6/1971 | Japan | 423/483 |

*Primary Examiner*—Jack Cooper
*Attorney, Agent, or Firm*—Barry A. Bisson; Robert A. Franks; John P. Grinnell

[57] ABSTRACT

Hydrofluoric acid is recovered from fluosilicic acid by reacting fluosilicic acid with sodium sulfate to form sodium fluosilicate. The sodium fluosilicate is reacted with a sodium-containing compound to form an alkaline aqueous slurry comprising silica and dissolved sodium fluoride. The reaction occurs under such conditions that the slurry contains precipitated amorphous silica. The precipitated amorphous silica is separated from the alkaline aqueous slurry leaving an aqueous solution of sodium fluoride. Sodium fluoride is recovered from the aqueous solution and reacted with sulfuric acid to produce hydrogen fluoride.

28 Claims, 2 Drawing Figures

RECOVERY OF HYDROFLUORIC ACID FROM FLUOSILICIC ACID

CROSS-REFERENCES

This is a continuation of application Ser. No. 953,803, filed Oct. 23, 1978, now abandoned.

This application is related to the following coassigned and co-pending U.S. patent applications: (1) application Ser. No. 953,802 filed on Oct. 23, 1978, now U.S. Pat. No. 4,213,951 by Subhas K. Sikdar annd James H. Moore, entitled "Recovery of Hydrofluoric Acid from Fluosilicic Acid with High pH Hydrolysis"; (2) Patent Application Ser. No. 953,801 filed on Oct. 23, 1978 now U.S. Pat. No. 4,213,952 by Subhas K. Sikdar and James H. Moore, entitled "Recovery of Hydrofluoric Acid from Fluosilicic Acid"; and (3) Application Ser. No. 954,066 filed on Oct. 23, 1978 now U.S. Pat. No.4,213,952 by Subhas K. Sikdar entitled, "Recovery of Hydrofluoric Acid from Fluosilicic Acid with High pH Hydrolysis".

BACKGROUND

Beneficiated phosphate rock from Florida typically contains 3 to 4% fluorine values. Phosphoric acid can be produced from this rock by treating it with sulfuric acid. Part of the fluorine present in the rock is evolved as silicon tetrafluoride and gaseous hydrofluoric acid, which upon scrubbing with pond water, form a dilute fluosilicic acid. By efficient design of scrubbers, it is possible to continuously produce a solution containing about 20% fluosilicic acid. The acid is usually contaminated with impurities, including 1,000 to 4,000 parts per million of $P_2O_5$.

It is desirable to recover the fluorine values present in the fluosilicic acid as anhydrous hydrofluoric acid. This is because hydrofluoric acid can be an important source of revenue. In addition, the presence of fluorine in the pond water presents an environmental pollution problem.

Many processes have been developed for concentration of dilute fluosilicic acid solutions, and preparation of hydrofluoric acid from the concentrated fluosilicic acid. Such attempts are described in U.S. Pat. Nos. 3,645,678; 3,645,679; 3,689,216; 3,855,399; 3,278,265; 3,218,124; 3,256,061; 3,140,152; 3,914,398; 3,537,817; 3,758,674; German Offen. Nos. 2,035,300, 2,032,855, and 2,248,149; and French Pat. No. 7,034,470. However, these processes suffer from one or more disadvantages. Disadvantages of these processes include operation at excessively high temperatures or under severe conditions, use of an excessive number of processing steps, consumption of uneconomical quantities of raw materials, production of undesirable byproducts, production of contaminated hydrogen fluoride, low yield of hydrogen fluoride, and considerable expenditure, both in terms of operating expense and initial capital investment. For example, U.S. Pat. Nos. 3,218,124 and 3,689,216 describe a process where fluosilicic acid solutions are treated with concentrated sulfuric acid to liberate silicon tetrafluoride and hydrogen fluoride, which are then separated. The silicon tetrafluoride is hydrolyzed to fluosilicic acid which is recycled and $SiO_2$ which is removed. Two disadvantages of this process are that a large volume of concentrated sulfuric acid is required per unit of fluosilicic acid and the splitting of the fluosilicic acid must be carried out at relatively high temperatures. This can result in severe corrosion of equipment.

U.S. Pat. No. 3,256,061 describes a process whereby fluosilicic acid is neutralized with ammonia, producing ammonium fluoride and silica. The silica is separated by filtration, and the ammonium fluoride is concentrated to a molten state constituting $NH_4F$-$NH_4HF_2$, which when treated with concentrated sulfuric acid produces hydrogen fluoride. Ammonia remains in the sulfuric acid and is sent to a phosphate acidulation unit. The chief drawbacks of this process are the requirement to recycle ammonia and the failure to remove any $P_2O_5$ impurity in the fluosilicic acid. A similar process is described in U.S. Pat. Nos. 3,914,398 and 3,537,817.

Therefore, there is a need for a simple, high yield process for recovering high purity hydrogen fluoride from phosphoric acid plant process streams.

SUMMARY OF THE INVENTION

The present invention is directed to a method with the above features for recovery of hydrogen fluoride from aqueous solutions of fluosilicic acid such as phosphate plant process streams. According to this process, an aqueous solution of fluosilicic acid is combined with sodium sulfate to form sodium fluosilicate. The formed sodium fluosilicate is reacted with a sodium-containing compound selected from the group consisting of sodium hydroxide, sodium carbonate, sodium silicate, and combinations thereof, for forming an alkaline aqueous slurry comprising silica and dissolved sodium fluoride. For proper control of the pH of the slurry, the preferred sodium-containing compound is sodium carbonate. To form precipitated amorphous silica by this reaction, the pH of the slurry is maintained at a value greater than 7 and up to about 9, the slurry is maintained at least saturated with sodium fluoride, and the temperature of the slurry is maintained substantially equal to its boiling point.

If the slurry contains precipitated sodium fluoride, the sodium fluoride is dissolved by adding water to the slurry. Then the precipitated amorphous silica is filtered from the slurry, leaving an aqueous solution of sodium fluoride. Sodium fluoride can be recovered from this solution by evaporating water from the solution, thereby precipitating sodiumfluoride, and separating the precipitated sodium fluoride from the remaining solution. The recovered sodium fluoride can be reacted with sulfuric acid to generate hydrogen fluoride.

DRAWINGS

Figure 2:
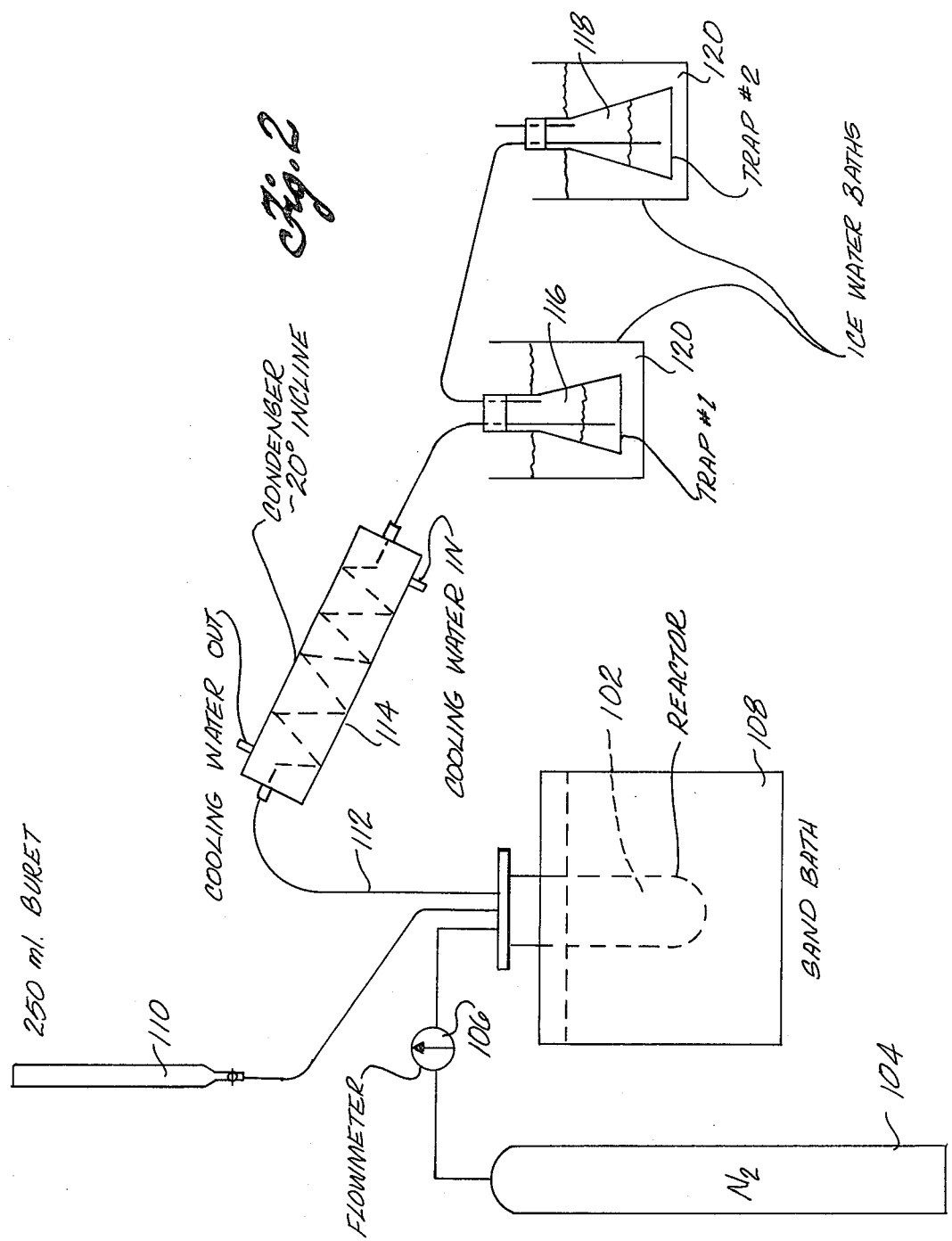

These and other features, aspects and advantages of the present invention will become more apparent upon consideration of the following description, appended claims, and accompanying drawings wherein:

FIG. 1 is a flowsheet of a process embodying features of the present invention; and FIG. 2 is a schematic drawing of equipment used for a test to demonstrate advantages of the present invention.

DESCRIPTION

With reference to FIG. 1, in a process according to the present invention, a fluosilicic acid feed 10 and sodium sulfate 12 are combined in an agitated purification vessel 14 to form sodium fluosilicate and a liquor containing sulfuric acid according to the following reaction:

$$H_2SiF_6 + Na_2SO_4 \rightarrow H_2SO_4 + Na_2SiF_6(s) \quad (1)$$

The fluosilicic acid feed can be a phosphoric acid plant process stream such as scrubber liquor. For this process to be economical, the scrubber liquor should contain at least 15% by weight fluosilicic acid, and preferably contains at least 20% by weight fluosilicic acid. Such scrubber liquor can contain from 1,000 to 4,000 parts per million $P_2O_5$ and other impurities. The purpose of reaction (1) in the purification vessel 14 is to separate the fluorine values in the fluosilicic acid feed from the impurities present by producing high purity sodium fluosilicate.

The solubility of sodium fluosilicate in sulfuric acid decreases as the temperature of the sulfuric acid decreases. Therefore, preferably the temperature of the purification vessel is maintained as low as possible. However, it is believed to be uneconomical to cool the purification vessel. Therefore, the reaction is conducted at about ambient temperature. It has been found that the reaction requires about 20 minutes to $2\frac{1}{2}$ hours at ambient temperature to go to completion, and in most situations, about 1 hour is sufficient.

Preferably, the stoichiometric quantity of sodium sulfate is used to react with the fluosilicic acid, because excess sodium sulfate can introduce impurities into the formed sodium fluosilicate. Sodium sulfate can be added as a solid, or in solution, preferably saturated, so as to introduce as little water as possible so that concentrated sulfuric acid can be produced as a byproduct. It has been found that by use of this reaction (1), yields in excess of 94% for sodium fluosilicate can be achieved, where the sodium fluosilicate contains only 0.06% $SO_4$.

It is believed that sodium silicate, sodium carbonate, and sodium hydroxide are not as satisfactory for the purification reaction (1) because when using impure fluosilicic acid these sodium-containing compounds, when combined with impure fluosilicic acid, tend to produce impure sodium fluoride rather than high purity sodium fluosilicate. It is believed that use of potassium or ammonia-containing compounds would also be unsatisfactory, because potassium fluosilicate and ammonia fluosilicate are substantially more soluble in water than is sodium fluosilicate.

The slurry 16 formed in the purifier 14 is introduced to a first separator 18, where the sodium fluosilicate 22 is separated from sulfuric acid liquor 20. The liquor can contain from 5 to 30% by weight sulfuric acid and can be used in the phosphoric acid plant (not shown) for reaction with phosphate rock.

The first separator, and all other separators described in this application, can be any suitable separation device such as a gravity sedimentation unit, a filtration unit, or a centrifuge. For example, the first separator 18 can be a cake filter, a pressure relief filter, or a vacuum drum filter.

The recovered sodium fluosilicate 22 is transferred to a precipitator 24 in which it is combined with a sodium-containing compound selected from the group consisting of sodium hydroxide, sodium carbonate, sodium silicate, and combinations thereof. The reaction produces an alkaline aqueous slurry comprising sodium fluoride and precipitated amorphous silica. Exemplary of the reactions which occur are the following:

$$Na_2SiF_6 + 2Na_2CO_3 \rightarrow 6NaF + SiO_2 \downarrow + 2CO_2 \uparrow \quad (2)$$

and $$Na_2SiF_6 + 4NaOH \rightarrow 6NaF + SiO_2 \downarrow + 2H_2O \quad (3)$$

It is important that the conditions in the precipitator be maintained such that amorphous silica is formed in the precipitator, so that the silica can be separated from the sodium fluoride. If a silica gel or a silica sol is formed in the precipitator 24, then it is extremely difficult, if not impossible, to separate the silica from the sodium fluoride. Amorphous silica is formed in the crystallizer by: (1) maintaining the pH of the alkaline aqueous slurry at a value greater than 7 and up to about 9, (2) controlling the water content of the alkaline aqueous-slurry sufficiently low such that the slurry is at least saturated with sodium fluoride, and (3) maintaining the temperature of the alkaline aqueous slurry substantially equal to its boiling point. All three of these requirements must be satisfied, or else amorphous silica is not produced.

As used herein, by the term "amorphous silica" there is meant silica not having a characteristic x-ray diffraction pattern.

For example, if the pH in the precipitator is less than 7, colloidal silica is formed, which cannot be filtered easily from sodium fluoride solution. If the pH of the alkaline aqueous slurry in the precipitator 24 is greater than or equal to 9 or less than 7, a high percentage of the formed silica is in solution, and thus cannot be separated from the sodium fluoride. Furthermore, when the pH of the slurry is less than 7, the precipitated silica is in the form of a difficult-to-filter gel.

Because the slurry is maintained near or at its boiling point, water vapor is evolved. The water vapor as well as any other gases evolved such as carbon dioxide, are withdrawn from the precipitator via line 28. The water vapor and other gases pass to a condenser 30 in which at least a portion of the water is condensed, and refluxed via line 32 to the precipitator. Non-condensed vapors ae withdrawn via line 34, and excess water, if any, is withdrawn from the system via line 36.

The precipitator is maintained under agitation to insure intimate mixing between the reactants, and to permit the precipitated silica to be withdrawn from the vessel as a portion of the slurry in line 38.

The preferred sodium-containing compound 26 to be added to the precipitator is sodium carbonate, because it has been found that by adding sodium carbonate, the pH of the slurry in the precipitator stays within the desired range. When using sodium hydroxide, it has been difficult to maintain the pH of the slurry within the desired range. In addition, sodium hydroxide, as well as sodium silicate, have a "post-precipitation" effect, where additional silica precipitates from the slurry after silica is separated from the slurry. (See Control 2 below)

The sodium-containing compound preferably is added in an amount about equal to stoichiometric. The sodium-containing compound can be added as a solid, but generally is added as a 50% by weight solution in water, the concentration of the solution depending upon how much water is needed in the precipitator to maintain the slurry saturated with sodium fluoride. The sodium fluosilicate can be added as a solid, or combined with water.

The residence time in the precipitator is that amount which is sufficient for the reaction between the sodium-containing compound and sodium fluosilicate to go to substantial completion. This takes from about 1 to about 3 hours.

Although this method has been described in terms of reacting sodium fluosilicate with a sodium-containing compound, it is also useful for reacting potassium fluosilicate with a potassium-containing compound, or for reacting ammonium fluosilicate with an ammonium-containing compound. In general, the precipitator can be used for reacting a silicate salt, $M_2SiF_6$, where M is selected from the group consisting of sodium, potassium, and ammonium, with a compound selected from the group consisting of MOH, $M_2CO_3$, $M_2SiO_3$, and combinations thereof, thereby forming an alkaline aqueous slurry comprising silica and the fluoride salt, MF. The pH of the alkaline aqueous slurry is maintained at a value greater than 7 and up to about 9, the water content of the alkaline aqueous slurry is maintained sufficiently low such that the slurry is at least saturated with the fluoride salt MF; and the temperature of the alkaline aqueous slurry is maintained substantially equal to its boiling point, so that the slurry contains precipitated amorphous silica. Although the following steps of a process according to this invention are described in terms of separating silica from a slurry containing sodium fluoride, the same steps can be used for separating amorphous silica from a slurry containing potassium fluoride or ammonium fluoride.

The slurry 38 withdrawn from the precipitator contains precipitated amorphous silica and an aqueous solution of sodium fluoride. Generally, the slurry 38 also contains precipitated sodium fluoride. This is because if the precipitator does not contain a saturated solution of sodium fluoride, amorphous silica is not formed in the precipitator. Therefore, to be sure to avoid formation of non-amorphous silica, the precipitator is conservatively operated so sodium fluoride precipitates.

If the slurry contains precipitated sodium fluoride, it is desirable to dissolve this sodium fluoride to avoid contamination of the silica with sodium fluoride and to avoid low yields of hydrofluoric acid. Therefore, before separating the precipitated silica from the slurry 38, the slurry 38 is introduced to an agitated dissolver 40, where it is combined with water 42, which is preferably heated. Sufficient water is added to the dissolver to dissolve substantially all of the sodium fluoride. Fluid 44 containing precipitated amorphous silica and a solution of sodium fluoride is withdrawn from the dissolver 40 and is introduced to a second separator 46 from which the amorphous silica 48 is withdrawn as a product. A solution of sodium fluoride 50 is withdrawn from the second separator and is passed to an evaporator 52.

The amorphous silica 48 produced by this process is of high purity, generally containing less than 2% by weight fluorine. The silica has been found to have a surface area of 37 meters squared per gram, a density of from 1.59 to 1.82 grams per cubic centimeter, a pore volume of 0.23, and a loss on ignition of from 6.7 to 7.9% by weight. The weight average particle size has been found to be from about 15 microns to about 24 microns. Therefore, the silica can be easily separated from the sodium fluoride solution by passing the slurry 44 through a filter, which should have an average pore size of less than about 15 microns.

In the evaporator 52, water is removed from the sodium fluoride solution 50 to precipitate the sodium fluoride. This can be done under vacuum. Preferably, the removed water 54 is recycled to the dissolver 40 to provide the bulk of the water introduced to the dissolver. The remainder of the water added to the dissolver is provided by make-up water 56. The sodium fluoride slurry 58 is passed from the evaporator 52 to a third separator 60, where sodium fluoride solid 62 is recovered. Sodium fluoride solution 64 recovered from the third separator 60 can be recycled to the precipitator 24 to recover the fluorine values contained therein.

Recovered sodium fluoride can be sold as a product, or can be used to produce hydrogen fluoride in a hydrogen fluoride generator 64. In the generator 64, the sodium fluoride is combined with a stoichiometric amount of sulfuric acid 65 to produce hydrogen fluoride 66 and sodium sulfate 68.

It is important to avoid the presence of air in the generator to minimize corrosion. A portion of the sodium sulfate 68 can be withdrawn as product, and some of it can be passed via line 70 for introduction to the purifier 14 for reaction with fluosilicic acid feed. Therefore, little, if any, sodium sulfate needs to be purchased for the process shown in FIG. 1. The contents of the generator 64 preferably are a paste or thick slurry for high yield.

The sulfuric acid 65 added to the generator 64 can be 80% to 100% sulfuric acid. It has been noted that the concentration of the sulfuric acid used in this range has little, if any, effect on hydrogen fluoride yield.

Preferably a stoichiometric amount of sulfuric acid is used in the generator because it has been found that an excess of sulfuric acid reduces yield.

The higher the temperature in the generator, the higher the yield of hydrogen fluoride. However, as the temperature increases, problems with corrosion also increase. The temperature in the generator is maintained in the range of from 80° C. to 300° C., and preferably at about 200° C., for high yield with minimal corrosion.

It is preferred that the hydrogen fluoride generation reactor 64 be operated as a batch reactor to minimize corrosion problems, and to avoid leakage of sulfuric acid and/or hydrofluoric acid to the environment.

The method of this invention has many significant advantages compared to other processes available. For example, unlike most other processes described in the literature, this process does not depend upon the hydrolysis of gasous silicon tetrafluoride. Therefore, no corrosive gases are handled until the hydrogen fluoride generation step. Thus, corrosion problems are minimized.

Another advantage of this process is that the fluoride is recovered from the fluosilicic acid in the form of sodium silicofluoride, which is substantially insoluble in water, and easily crystallizable. The solubility of sodium silicofluoride in the purifier is reduced in the presence of a slight excess of sodium sulfate. For example, the solubility of sodium silicofluoride is only 0.38 gram sodium silicofluoride per 100 grams solution at 20° C. in the presence of 0.35% sodium sulfate solution, as compared to a solubility of 0.67 gram per 100 grams solution at 20° C. with no sodium sulfate. Sodium silicofluoride is one of the most insoluble salts of fluosilicic acid, and hence the purification operation is a convenient and efficient method of purifying the fluorine values in fluosilicic acid containing objectionable impurities such as phosphates.

A further advantage of the present invention is that corrosion of equipment is minimized because all of the steps, except for the generation of hydrogen fluoride, are carried out at relatively low temperatures.

A further advantage of the process is the last step, where sodium sulfate is produced as a by-product, which is reused in the first step. Thermodynamic analysis indicates that the reaction between sodium fluoride and sulfuric acid is highly favorable and is less endothermic than the corresponding parallel reaction between calcium fluoride and sulfuric acid.

A further advantage of the process is that the pricipitated silica is usable as a by-product because of its high purity.

These and other advantages of the present invention will become more apparent with respect to the following examples:

EXAMPLE 1

(Production of sodium fluosilicate from fluosilicic acid)

Three batch tests were conducted for the production of sodium fluosilicate from fluosilicic acid. Reagent grade 30% fluosilicic acid solution was diluted with water to make 20% fluosilicic acid. The reaction was conducted in a beaker at 21° C. (room temperature) with addition of either solid or saturated solution of anhydrous sodium sulfate to a stirred solution of fluosilicic acid. The reaction time provided was 1½ hours. Table 1 presents the amount and form of sodium sulfate added for each of the three tests, as well as the yield and purity of the sodium silicofluoride product.

TABLE 1

| Test | Form of $Na_2SO_4$ | $Na_2SO_4$ added % Stoichiometric | % Yield | Purity % by Weight $SO_4$ |
|---|---|---|---|---|
| 1A | Saturated Solution | 116% | 95 | 0.18% |
| 1B | Saturated Solution | 100% | 90 | 0% |
| 1C | Solid | 100% | 92 | 4.2% |

EXAMPLE 2

(Production of sodium fluosilicate from fluosilicic acid)

Eight tests were conducted for the reaction of fluosilicic acid with sodium sulfate. A 20% solution of fluosilicic acid was obtained by diluting 30-32% reagent grade fluosilicic acid. The acid was placed in a stirred beaker immersed in a constant temperature bath. Anhydrous solid sodium sulfate was added to the stirred beaker in five equal installments, where were added at equal intervals throughout the reaction. After a predetermined reaction time, the slurry was filtered, and the solid sodium silicofluoride product crystals were washed with cold water and then with reagent grade alcohol. The crystals were then dried and yield was determined. The crystals were analyzed for their purity. The temperature of reaction, time of reaction, concentration of sulfuric acid used, percent excess of sulfuric acid, flow rate of nitrogen, and yield are presented in Table 2.

TABLE 2

| Test | Reaction Temperature | % Excess $Na_2SO_4$ | Reaction Time (hr.) | Yield % by Weight |
|---|---|---|---|---|
| 2A | 20 | 0 | 1 | 94.1 |
| 2B | 30 | 0 | 1 | 92.7 |
| 2C | 20 | 1.5 | 1 | 93.6 |
| 2D | 30 | 1.5 | 1 | 92.9 |
| 2E | 20 | 0 | 3 | 94.6 |
| 2F | 30 | 0 | 3 | 92.2 |
| 2G | 20 | 1.5 | 3 | 94.3 |
| 2H | 30 | 1.5 | 3 | 93.9 |

Sodium silicofluoride of very high purity was produced. Sulfate impurities varied between 0.06 to 0.6% by weight, the high values coming from tests having excess sodium sulfate. The yield varied between 92.3 and 94.6%. The yield values, however, do not reflect loss due to solubility in the mother liquor and loss during washing.

The Yates' method of analysis was used. Based on the results of this analysis, the following conclusions were drawn:

1. Temperature is the most important variable influencing the yield, with lower temperatures favoring higher yield.
2. Excess sodium sulfate at time of reaction is relatively unimportant as to yield. Excess sodium sulfate introduces a slight sulfate impurity in the product.
3. As temperature of reaction is increased, additional sodium sulfate is required to maintain yield, with the sodium sulfate supressing the solubility of the sodium fluosilicate by the well-known principle of common ion effect.

EXAMPLE 3

(Production of sodium fluosilicate from fluosilicic acid)

Solid sodium sulfate, 99% pure, was reacted with a 20% solution of fluosilicic acid in a stoichiometric amount at 20° C. for 1 hour. The solid sodium fluosilicate contained 0.06% sulfate. The yield was 94.1% by weight, and the sodium fluosilicate had an average analysis of 25.7% sodium, 15.0% silicon, and 59.3% fluorine, all by weight. The waste stream resulting from separation of the sodium fluosilicate contained about 20% $H_2SO_4$, and 12.25 grams of fluorine per liter.

CONTROL 1

(Production of silica sol or gel)

This test shows the importance of controlling pH and controlling reaction temperature when reacting sodium fluosilicate with sodium hydroxide to produce amorphous silica.

A series of batch hydrolysis tests were conducted for the reaction between sodium fluosilicate and sodium hydroxide. Enough water was initially present to dissolve all of the sodium fluoride produced by the reaction so that silica formed could be filtered and the sodium fluoride recovered from the filtrate. The reactants were added to an agitated vessel in installments and the pH was controlled at various values between 7 and 11. The reaction chamber was immersed in a constant temperature bath maintained at temperatures between 50° C. and 75° C.

Irrespective of the pH or the temperature maintained in the reaction vessel, the precipitate could never be filtered in a reasonable length of time. A silica sol or gel was obtained below a pH of approximately 10. The sol went through filter cloth or paper and the gel plugged the filter pores in a matter of seconds. Above a pH of 10, sometimes no precipitate at all was formed.

CONTROL 2

(Post-Precipitation)

These tests demonstrate the importance of maintaining the pH of the slurry in the crystallizer at a value less than 9 when reacting sodium hydroxide with sodium fluosilicate.

Three tests were conducted with stoichiometric ratios of sodium fluosilicate and sodium hydroxide. The sodium hydroxide was added in 25%, 20%, and 15% solutions. The reaction vessel was supplied with a reflux condenser. After reaction for two to three hours, water was added to the vessel to dissolve any precipitated sodium fluoride. The slurry in the vessel was then filtered, with excellent filtration occuring. Chemical analysis of the precipitate confirmed that the precipitate was silica and X-ray diffraction analysis indicated that it was amorphous silica. The density of the precipitate was found to be about 1.8–1.9 g/cc, suggesting a highly porous structure. The dominant particle sizes ranged between 20 and 40 microns. However, the filtrate, when standing overnight, became milky and a gel settled at the bottom. The pH of the mother liquor was always around 9 or 10. Thus, at these pH's, the mother liquor becomes supersaturated with amorphous silica, and on standing becomes unstable, thus leading to the post precipitation.

EXAMPLE 4

(Hydrolysis of sodium silicofluoride with sodium carbonate)

Twenty-five grams of solid sodium silicofluoride were mixed with 112.8 grams of 25% by weight sodium carbonate solution in a 250 milliter Corning conical flask fitted with a reflux condenser cooled by tap water. The flask was placed on a hot plate and the contents of the flask were maintained at about 100° C. After three hours, the reaction mass was cooled. The reaction mass had a pH of 8.0. The reaction mass was transfered to a one liter beaker and 900 cc of deionized water were added, with vigorous stirring at room temperature for about 10 minutes. The resultant slurry was then filtered. The filtered precipitate was a white, fine, porous powder of amorphous silica which washed well. The amount of precipitate obtained was 7.8 grams. The silica had a surface area of 37 meters square per gram a density of 1.82 grams per cubic centimeter, a pore volume of 0.23, a loss on ignition of 7.9% by weight, and a weight average particle size of about 15 microns. The silica contained 0.67% by weight fluorine. No crystalline matter was found in the precipitate by X-ray diffraction analysis. The filtrate which was recovered amounted to 950 cc, and contained 16.0 grams of fluorine per liter.

EXAMPLE 5

(Hydroylsis of sodium silicofluoride with sodium hydroxide)

Using the method and equipment of Example 4, solid sodium fluosilicate was reacted with a 15% by weight solution of sodium hydroxide. Amorphous silica was formed, the silica containing 2% by weight fluoride. The silica exhibited a loss on ignition of 6.7% by weight, a density of 1.59 grams per cubic centimeter, and a weight average particle size of 23.6 microns. The filtrate contained 14.5 grams of fluorine per liter.

EXAMPLE 6

(Evaporation of water from sodium fluoride solution)

One thousand grams of saturated sodium fluoride solution are introduced to an evaporator. Five hundred grams of water are evaporated from the solution, thereby producing 27.5 grams of solid sodium fluoride.

EXAMPLE 7

(Evaporation of water from sodium fluoride solution)

Five hundred cubic centimeters of filtrate prepared according to the method of Example 5 were introduced to an evaporator maintained at a temperature of 100° C. 285 cc of water vapor were removed, producing 7.7 grams of solid sodium fluoride and 215 cc of liquor saturated with sodium fluoride.

EXAMPLE 8

(HF generation)

These tests were conducted to show the feasability of producing hydrogen fluoride from sodium fluoride. FIG. 2 shows a schematic of the experimental equipment used. Forty-two grams of sodium fluoride were pre-heated to a desired temperature in a Monel reactor 102. Nitrogen gas was passed from storage tank 104 through a flowmeter 106 into the reactor 102 to drive out any oxygen present to avoid corrosion problems. The reactor was in a sand bath 108 to maintain the desired temperature in the reactor. After purging the nitrogen, sulfuric acid was introduced quickly into the reactor 102 from a buret 110. The reaction started immediately as evidenced by a large (sometimes 40° C.) drop in temperature. The product gas was led via line 112 to a water-cooled Monel condenser 114 into two serialy connected caustic soda traps 116 and 118 kept in ice water baths 120. The first trap 116 contained a 20% solution of sodium hydroxide and the second trap 118 contained a 10% solution of sodium hydroxide. In the traps, the hydrogen fluoride reacted with the sodium hydroxide to produce sodium fluoride, which precipitated. About 5 minutes after the sulfuric acid addition, the nitrogen gas flow was resumed. The nitrogen gas assisted in carrying HF from the reactor. The sodium fluoride formed in the traps was filtered, washed with water and reagent alcohol, dried and weighed. At the completion of the reaction period, the contents of the reactor 102 were dissolved in water and analyses were conducted for sulfate and fluoride ions.

Eight tests were conducted. The reaction temperature, time of reaction, concentration of sulfuric acid, percent excess of sulfuric acid, flow rate of nitrogen, and yield for each test is presented in Table 3.

The results of the test were analyzed according to the Yates' method. Based on this analysis, the following conclusions were reached:

1. Flow of nitrogen did not have any influence on yield.
2. Time was not significant with regard to yield. This indicates that no further reaction takes place after the first hour of reaction. This also indicates that diffusion limits the reaction. Therefore, some form of mixing is necessary to increase yield.
3. The strength of the sulfuric acid appears to have no influence on yield, i.e. 80% sulfuric acid seems to produce the same yield as 96.5% sulfuric acid.
4. Excess sulfuric acid appears to decrease yield.

TABLE 3

| Test | Reaction Temp. (°C.) | Reaction Time (Hr.) | $H_2SO_4$ Concentration (% wt.) | % Excess $H_2SO_4$ | $N_2$ Rate (Standard cc/min.) | Yield (% by Weight) |
| --- | --- | --- | --- | --- | --- | --- |
| 8A | 150 | 1 | 80 | 0 | 100 | 23.7 |
| 8B | 200 | 1 | 80 | 2 | 100 | 32.9 |
| 8C | 150 | 2 | 80 | 2 | 300 | 18.9 |

TABLE 3-continued

| Test | Reaction Temp. (°C.) | Reaction Time (Hr.) | $H_2SO_4$ Concentration (% wt.) | % Excess $H_2SO_4$ | $N_2$ Rate (Standard cc/min.) | Yield (% by Weight) |
|---|---|---|---|---|---|---|
| 8D | 200 | 2 | 80 | 0 | 300 | 49.9 |
| 8E | 150 | 1 | 95 | 2 | 300 | 24.2 |
| 8F | 200 | 1 | 95 | 0 | 300 | 41.1 |
| 8G | 150 | 2 | 95 | 0 | 100 | 33.6 |
| 8H | 200 | 2 | 95 | 2 | 100 | 40.2 |

5. Temperature is by far the most important variable affecting yield, with higher temperatures increasing yield.

EXAMPLE 9

(HF generation)

In one set of two experiments either of 80% or 96.5% $H_2SO_4$ at 100% excess was used. The reaction mixture was prepared at 0° C. in an ice bath and then the reactor was assembled. The heating then was started and nitrogen flow was turned on. A final temperature of about 160° C. was obtained after about five (5) hours. The yield with 80% $H_2SO_4$ was 83.3% while that with 96.5% was 78%.

EXAMPLE 10

(HF generation)

In a variation of Example 9, a condenser was mounted vertically on the reactor to act as a reflux condenser. Thus only HF was allowed to leave the reactor. Severe corrosion resulted. Nevertheless the yield was consistently around 80%.

EXAMPLE 11

(HF generation)

An attempt was made to reach stoichiometric yield. A platinum crucible was used to effect the reaction. The yield was calculated from F analysis of the solution made by dissolving the solid residue in a definite quantity of water. Two experiments were carried out. The yields were 95.6 and 97.4%.

Based on the tests with generation of hydrogen fluoride from sulfuric acid and sodium fluoride, it was concluded that corrosion can limit the extent of reaction and mixing of the reactants can improve yield.

Although this process has been described in considerable detail with reference to certain versions thereof, other versions are possible. Therefore, the spirit and scope of the appended claims should not be limited to the description of the preferred versions contained herein.

What is claimed is:

1. A method for recovering sodium fluoride and solid amorphous silica from an aqueous solution of fluosilicic acid comprising the steps of:
   (a) reacting fluosilicic acid in aqueous solution with sodium sulfate to form sodium fluosilicate in a purification zone;
   (b) reacting in an aqueous medium in a precipitation zone at least a portion of the formed sodium fluosilicate with a sodium compound selected from the group consisting of sodium hydroxide, sodium carbonate, sodium silicate and combinations thereof, to form an alkaline aqueous slurry comprising amorphous silica and dissolved sodium fluoride, by maintaining, during said reaction of sodium fluosilicate with the sodium compound, the pH of the alkaline aqueous slurry at a value greater than 7 and up to about 9, the alkaline aqueous slurry being at least saturated with sodium fluoride, and the temperature of the alkaline aqueous slurry being substantially equal to its boiling point so that an amorphous silica precipitate is formed;
   (c) adding water to the alkaline aqueous slurry when said alkaline aqueous slurry contains precipitated sodium fluoride to dissolve substantially all of the precipitated sodium fluoride;
   (d) filtering at least a portion of the precipitated amorphous silica from the alkaline aqueous slurry leaving a filtrate comprising sodium fluoride; and
   (e) recovering sodium fluoride from the filtrate comprising sodium fluoride.

2. The method of claim 1 in which the alkaline aqueous slurry contains precipitated sodium fluoride, and including the step of adding water to the alkaline aqueous slurry in a dissolving zone to dissolve substantially all of the precipitated sodium fluoride before the step of filtering precipitated amorphous silica from the alkaline aqueous slurry.

3. The method of claim 2 in which the step of recovering sodium fluoride from the filtrate comprises evaporating water from the filtrate in an evaporation zone to form an aqueous slurry comprising solid sodium fluoride and a solution saturated with respect to sodium fluoride.

4. The method of claim 3 including the step of recycling at least a portion of the evaporated water to the dissolving zone.

5. The method of claim 3 including the steps of passing the aqueous slurry from the evaporation zone to a separation zone and separating solid sodium fluoride from the solution saturated with respect to sodium fluoride.

6. The method of claim 5 including the step of passing at least a portion of the solution saturated with respect to sodium fluoride from the separation zone to the precipitation zone.

7. The method of claim 1 in which the step of recovering sodium fluoride from the filtrate comprises evaporating water from the filtrate in an evaporation zone to form an aqueous slurry comprising solid sodium fluoride and a solution saturated with respect to sodium fluoride.

8. The method of claim 1 including the additional step of reacting the recovered sodium fluoride with sulfuric acid in a hydrogen fluoride generation zone maintained at a temperature of at least about 80° C. to form hydrogen fluoride and sodium sulfate.

9. The method of claim 8 in which at least a portion of the sodium sulfate formed in the hydrogen fluoride generation zone is reacted with fluosilicic acid in the purification zone.

10. The method of claim 1 including the steps of evaporating water from the alkaline aqueous slurry in the precipitation zone, condensing the evaporated water, and refluxing at least a portion of the condensed water to the precipitation zone.

11. The method of claim 1 in which the aqueous solution of fluosilicic acid comprises scrubber liquor from a phosphate plant, where the scrubber liquor contains at least 15% by weight fluosilicic acid and from about 1,000 to about 4,000 parts per million $P_2O_5$.

12. The method of claim 1 in which the sodium-containing compound is introduced to the precipitation zone in solution, the solution containing from about 10 to about 50% by weight of the sodium-containing compound.

13. A method for recovering solid amorphous silica from a fluosilicate salt comprising the steps of
(a) reacting in an aqueous medium a fluosilicate salt, $M_2SiF_6$, where M is selected from the group consisting of sodium, potassium, and ammonium, with a compound selected from the group consisting of MOH, $M_2CO_3$, $M_2SiO_3$, and combinations thereof, to form an alkaline aqueous slurry comprising amorphous silica and the fluoride salt MF; wherein during said reaction, the pH of the alkaline aqueous slurry is maintained at a value greater than 7 and up to about 9, the water content of the alkaline aqueous slurry is maintained sufficiently low such that the slurry is at least saturated with the fluoride salt, and the temperature of the alkaline aqueous slurry is maintained substantially equal to its boiling point so that an amorphous silica precipitate is formed;
(b) adding water to the alkaline aqueous slurry when said alkaline aqueous slurry contains precipitated fluoride salt to dissolve substantially all of the precipitated fluoride salt; and
(c) separating at least a portion of the precipitated amorphous silica from the alkaline aqueous slurry leaving an aqueous solution comprising the fluoride salt.

14. The method of claim 13 in which the precipitated amorphous silica is separated from the alkaline aqueous slurry by filtering the slurry through a filter having an average pore size less than about 15 microns.

15. The method of claim 13 in which at least 50% by weight of the separated amorphous silica has a diameter greater than about 15 microns.

16. A method for recovering hydrogen fluoride and solid amorphous silica from phosphate plant scrub liquor comprising at least 15% by weight fluosilicic acid and at least 1000 parts per million $P_2O_5$, comprising the steps of:
(a) combining the scrub liquor containing fluosilicic acid with sodium sulfate at about ambient temperature and forming solid sodium fluosilicate in a purification zone;
(b) recovering such sodium fluosilicate;
(c) reacting recovered sodium fluosilicate with sodium carbonate in a precipitation zone to form an alkaline aqueous aqueous slurry comprising silica and dissolved sodium fluoride; wherein during said reaction the pH of the alkaline aqueous slurry is maintained at a value greater than 7 and up to about 9, the water content of the alkaline aqueous slurry is maintained sufficiently low such that the slurry contains solid sodium fluoride, and the temperature of the alkaline aqueous slurry is maintained substantially equal to its boiling point so that an amorphous silica precipitate is formed;
(d) adding sufficient water to the alkaline aqueous slurry in a dissolving zone to dissolve substantially all of the solid sodium fluoride; and thereafter;
(e) separating at least a part of the precipitated amorphous silica from the alkaline aqueous slurry leaving an aqueous solution comprising sodium fluoride;
(f) evaporating water from the aqueous solution comprising sodium fluoride in an evaporation zone to form an aqueous slurry comprising solid sodium fluoride and a solution saturated with respect to sodium fluoride;
(g) recycling at least a portion of evaporated water to the dissolving zone;
(h) passing the aqueous slurry from the evaporation zone to a separation zone and separating the solid sodium fluoride from the solution saturated with respect to sodium fluoride;
(i) introducing at least a portion of the solution saturated with respect to sodium fluoride from the separation zone to the precipitation zone;
(j) reacting solid sodium fluoride separated in the separation zone with sulfuric acid in a hydrogen fluoride generation zone maintained at a temperature of at least about 80° C. to form hydrogen fluoride and sodium sulfate;
(k) introducing at least a portion of the sodium sulfate formed in the hydrogen fluoride generation zone to the purification zone; and
(l) recovering hydrogen fluoride formed in the hydrogen fluoride generation zone.

17. A method for recovering sodium fluoride and solid amorphous silica from an aqueous solution comprising at least 15% by weight fluosilicic acid comprising the steps of:
(a) reacting fluosilicic acid in an aqueous solution with sodium sulfate to form sodium fluosilicate in a purification zone;
(b) reacting in an aqueous medium the formed sodium fluosilicate with sodium carbonate in a reaction zone to form an alkaline aqueous slurry comprising sodium fluoride and precipitated filterable amorphous silica by maintaining during said reaction of sodium fluosilicate and sodium carbonate:
(i) the pH of the alkaline aqueous slurry at a value greater than 7 and up to about 9;
(ii) the water content of the alkaline aqueous slurry sufficiently low such that the slurry is at least saturated with respect to sodium fluoride; and
(iii) the temperature of the alkaline aqueous slurry substantially equal to its boiling point;
(c) adding water to the alkaline aqueous slurry when said alkaline aqueous slurry contains precipitated sodium fluoride to dissolve substantially all of the precipitated sodium fluoride;
(d) filtering at least a part of the precipitated amorphous silica from the alkaline aqueous slurry leaving a filtrate comprising sodium fluoride; and
(e) recovering sodium fluoride from the filtrate comprising sodium fluoride.

18. The method of claim 17 in which the alkaline aqueous slurry contains precipitated sodium fluoride, and including the step of adding water to the alkaline aqueous slurry in a dissolving zone to dissolve substantially all of the precipitated sodium fluoride before the step of filtering precipitated amorphous silica from the alkaline aqueous slurry.

19. The method of claim 16 in which the step of recovering sodium fluoride from the filtrate comprises evaporating water from the filtrate in an evaporation zone to form an aqueous slurry comprising solid sodium fluoride and a solution saturated with respect to sodium fluoride.

20. The method of claim 19 including the step of recycling at least a portion of the evaporated water to the dissolving zone.

21. The method of claim 19 including the step of passing the aqueous slurry from the evaporation zone to a separation zone to separate solid sodium fluoride from the solution saturated with respect to sodium fluoride.

22. The method of claim 21 including the step of passing at least a portion of the solution saturated with respect to sodium fluoride from the separation zone to the reaction zone.

23. The method of claim 17 in which the step of recovering sodium fluoride from the filtrate comprises evaporating water from the filtrate in an evaporation zone to form an aqueous slurry comprising solid sodium fluoride and a solution saturated with respect to sodium fluoride.

24. The method of claim 17 including the additional step of reacting the recovered sodium fluoride with sulfuric acid in a hydrogen fluoride generation zone maintained at a temperature of at least about 80° C. to form hydrogen fluoride and sodium sulfate.

25. The method of claim 24 in which at least a portion of the sodium sulfate formed in the hydrogen fluoride generation zone is reacted with fluosilicic acid in the purification zone.

26. The method of claim 17 including the steps of evaporating water from the alkaline aqueous slurry in the reaction zone, condensing the evaporated water, and refluxing at least a portion of the condensed water to the reaction zone.

27. The method of claim 17 in which the aqueous solution comprising fluosilicic acid comprises a process stream from a phosphate plant, where the process stream contains from about 1,000 to about 4,000 parts per million $P_2O_5$.

28. The method of claim 17 in which the sodium carbonate is introduced to the reaction zone in solution, the solution containing from about 10 to about 50% by weight of sodium carbonate.

* * * * *